United States Patent
Coggi et al.

(10) Patent No.: US 9,632,257 B2
(45) Date of Patent: Apr. 25, 2017

(54) PLUG-IN CONNECTION

(71) Applicant: Diamond SA, Losone (CH)

(72) Inventors: Victor Coggi, Losone (CH); Maurizio Minazzi, Germignaga (IT)

(73) Assignee: DIAMOND SA, Losone (CH)

( * ) Notice: Subject to any disclaimer, the term of this patent is extended or adjusted under 35 U.S.C. 154(b) by 85 days.

(21) Appl. No.: 14/405,171

(22) PCT Filed: May 30, 2013

(86) PCT No.: PCT/EP2013/061163
§ 371 (c)(1),
(2) Date: Dec. 3, 2014

(87) PCT Pub. No.: WO2013/182476
PCT Pub. Date: Dec. 12, 2013

(65) Prior Publication Data
US 2015/0147033 A1 May 28, 2015

(30) Foreign Application Priority Data

Jun. 7, 2012 (EP) ..................................... 12171190

(51) Int. Cl.
*G02B 6/38* (2006.01)
*G02B 6/36* (2006.01)

(52) U.S. Cl.
CPC ......... *G02B 6/3849* (2013.01); *G02B 6/3628* (2013.01); *G02B 6/3893* (2013.01);
(Continued)

(58) Field of Classification Search
None
See application file for complete search history.

(56) References Cited

U.S. PATENT DOCUMENTS 5,845,036 A * 12/1998 De Marchi .......... G02B 6/3825
385/139
6,276,839 B1 * 8/2001 De Marchi .......... G02B 6/3821
385/53
(Continued)

FOREIGN PATENT DOCUMENTS

EP 0338727 A2 10/1989
EP 0538089 A1 4/1993
(Continued)

*Primary Examiner* — Mike Stahl
(74) *Attorney, Agent, or Firm* — Nath, Goldberg & Meyer; Jerald L. Meyer; Stanley N. Protigal

(57) ABSTRACT

A plug part for a plug-in connection, in particular of optical conductors, includes a plug housing, in which a plug insert having at least one plug pin for receiving a conductor is arranged. The plug part can be inserted into a correspondingly designed socket part in an insertion direction (A), and includes a locking means for releasably locking the plug part in the socket part. The plug part further has an unlocking means, by means of which the locking of the locking means to the socket part can be released. The plug part includes a protective apparatus for protecting the end face of the plug pin and for moving from a closed position with a covered end face to an open position with an exposed end face by inserting the plug part into the socket part by interacting with the socket part.

23 Claims, 6 Drawing Sheets

Figure 1:
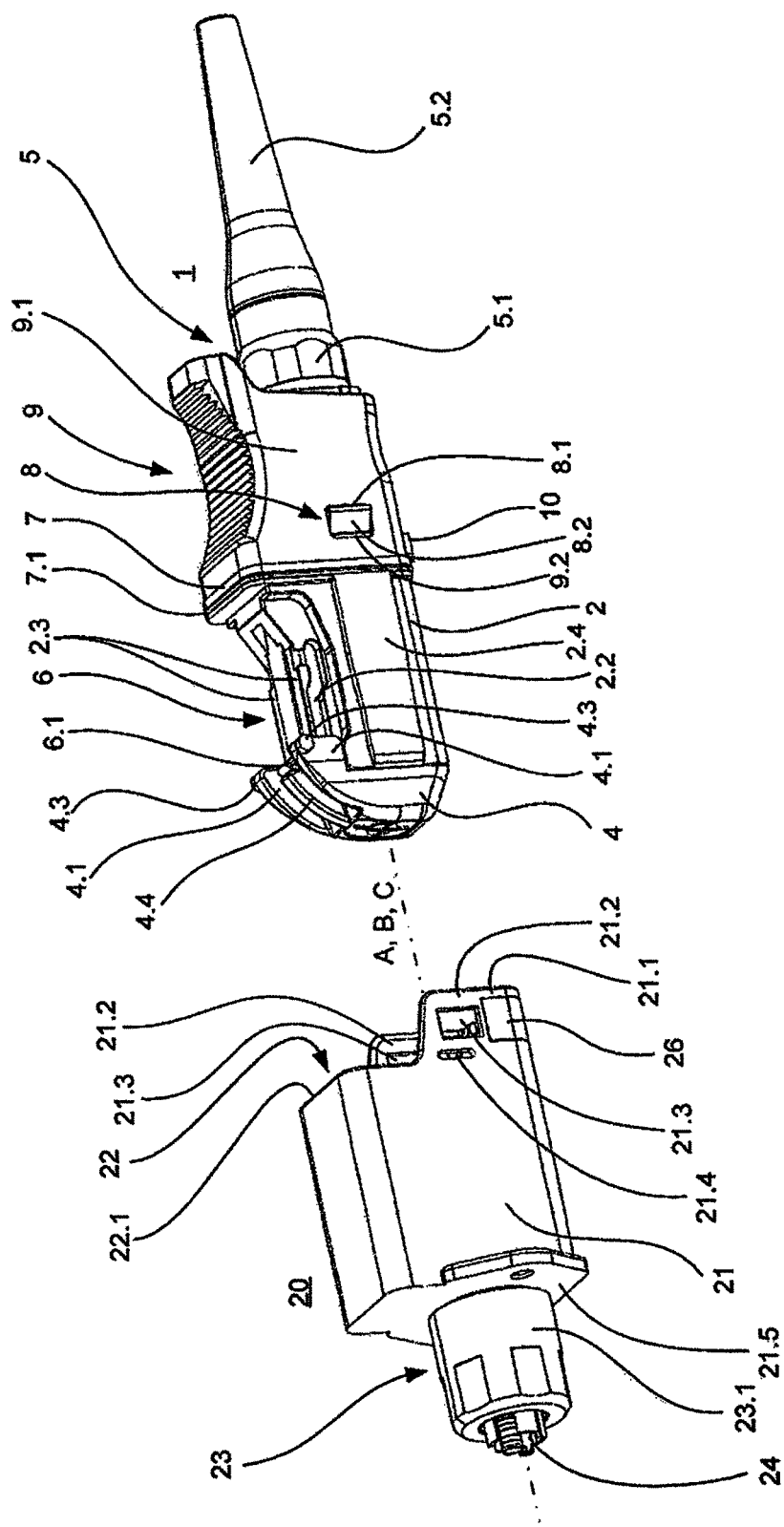

(52) U.S. Cl.
CPC .......... *G02B 6/3821* (2013.01); *G02B 6/3825* (2013.01); *G02B 6/3878* (2013.01); *G02B 6/3897* (2013.01)

(56) References Cited

U.S. PATENT DOCUMENTS

| | | | | |
|---|---|---|---|---|
| 6,471,416 B2* | 10/2002 | Lu | ........................ | G02B 6/3807 385/139 |
| 6,561,699 B1* | 5/2003 | De Marchi | .......... | G02B 6/3893 385/58 |
| 2005/0058402 A1 | 3/2005 | Ernst et al. | | |
| 2006/0204200 A1 | 9/2006 | Lampert et al. | | |
| 2008/0273842 A1* | 11/2008 | Tanaka | ................. | G02B 6/3849 385/90 |
| 2009/0185778 A1 | 7/2009 | Howard et al. | | |
| 2011/0200294 A1 | 8/2011 | Case | | |

FOREIGN PATENT DOCUMENTS

| | | | |
|---|---|---|---|
| EP | 0570652 | A2 | 11/1993 |
| EP | 0916978 | A1 | 5/1999 |
| EP | 1925958 | A1 | 5/2008 |
| JP | 04102808 | A | 4/1992 |
| JP | 6-11628 | A * | 1/1994 |
| WO | 02071122 | A1 | 9/2002 |

\* cited by examiner

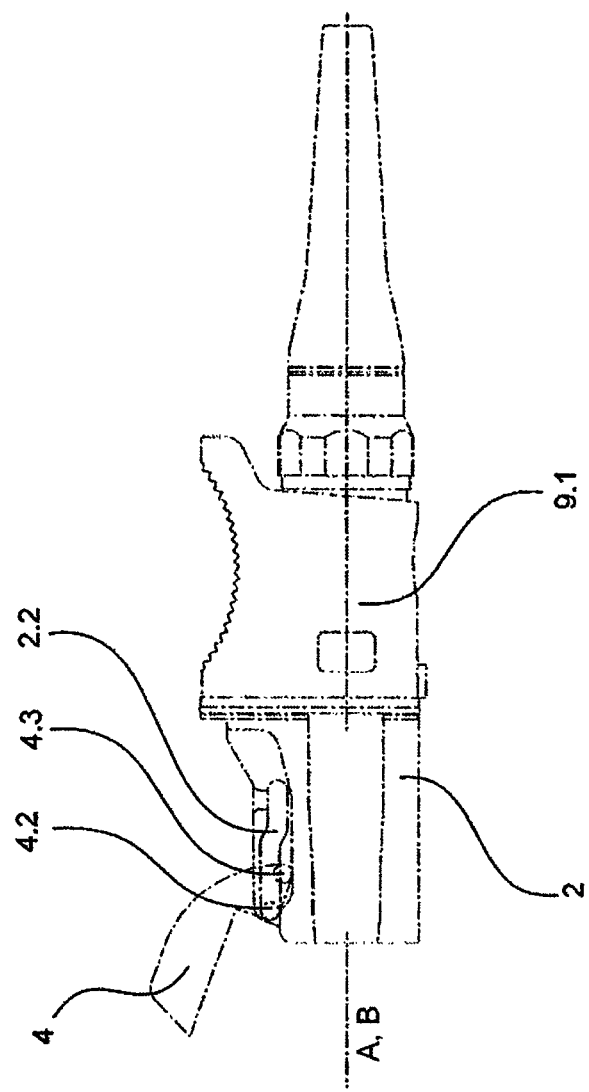

PLUG-IN CONNECTION

This is a National Phase Application filed under 35 U.S.C. 371 as a national stage of PCT/EP2013/061163, filed May 30, 2013, an application claiming the benefit of European Application No. 12171190.7-2217, filed Jun. 7, 2012, the content of each of which is hereby incorporated by reference in its entirety.

The invention relates to a plug part and also to a socket part for a plug-in connection, in particular for a plug-in connection of optical cables, as claimed in the preambles of claims 1 and 16.

In contrast to electrical plug-in connections, in the case of optical plug-in connections, even low levels of contamination can lead to transmission attenuation since glass fibers with extremely small cross sections have to be oriented with the end faces facing one another. Therefore, protective apparatuses have already been proposed in the case of plug parts, it being possible for plug pins to be protected by said protective apparatuses when plug parts are not connected.

By way of example, EP 0 570 652 A2 describes a plug-in connection for optical waveguides, in which the plug pin of the plug part is protected by a cover which is opened when the plug part is linearly inserted into the socket part. To this end, the socket part is provided with a control path, for example in the form of guide grooves which interact with the cover in order to open said cover. When the plug part is withdrawn, the cover will once again close with the aid of the control path. Removal of the plug part is prevented by means of catches of the socket part which latch onto the plug part. A rocker lever of the plug part allows the latching to be released by finger pressure before removal.

While this solution allows a satisfactory use indoors, protection of the sensitive optical elements is not sufficiently ensured when used outdoors. In addition, the means for releasing the latching for example is not very robust and handling for removal of the plug part requires comparatively difficult manipulation. This may be disadvantageous particularly in field applications outdoors.

WO 2011/066339 A1 describes a plug-in connection for outdoor use, in which the plug-in connection is protected by an encapsulation. In this case, the plug connectors can comprise known plug parts which are accommodated in a housing which can be locked to a corresponding socket part by means of a coupling nut.

While this solution allows a robust plug-in connection, the structure is complicated. In addition to the plug and socket parts which are required in any case (here and in the text which follows jointly called: plug-in connector), complex housing parts and additional screw closures are additionally required, and therefore this solution appears to be unfavorable from an economical point of view. Last but not least, handling is not very convenient and the plug pins are exposed when the plug part is removed.

The object of the invention is therefore to provide plug-in connectors for a plug-in connection of the kind described in the introductory part in which the disadvantages of the prior art are overcome. One object of the invention in particular is to provide plug-in connectors which are simple in terms of structure and ensure simple and reliable handling. A further object is to design the plug-in connectors to be robust and suitable for outdoor use, wherein the plug pins are reliably protected against impurities, water splashes and mechanical influences.

According to the invention, these objects are achieved by a plug part having the features of claim 1, and also by a socket part as claimed in the features of claim 16. Claim 1 relates to a plug part for a plug-in connection, in particular for a plug-in connection of optical conductors, comprising a plug housing, in which a plug insert having at least one plug pin for receiving a conductor, in particular an optical conductor, is arranged. In this case, the plug part can be inserted into a correspondingly designed socket part in an insertion direction, and comprises a locking means for releasably locking the plug part in the socket part. The plug part further has an unlocking means, by means of which the locking of the locking means to the socket part can be released. The plug part comprises a protective apparatus for protecting the end face of the plug pin, which protective apparatus can be moved from a closed position with a covered end face to an open position with an exposed end face, wherein the protective apparatus can be moved from the closed position to the open position by inserting the plug part into the socket part by interacting with the socket part. In this case, the protective apparatus preferably has at least one control element which can interact or interacts with the socket part during insertion in order to move the protective apparatus from the closed position to the open position. The invention is distinguished in that the unlocking means is displaceably mounted on the plug housing substantially along the insertion direction, wherein the unlocking means can interact with the locking means in such a way that, in the case of longitudinal displacement of the unlocking means with respect to the plug housing in the direction against the insertion direction, locking which is established by the locking means can be released.

In this case, insertion direction refers to a direction in which the plug part is inserted into a corresponding socket part when used as intended. Plug parts are generally of elongate design, wherein the longitudinal direction of the plug coincides with the insertion direction.

A region "at the front" and a region "at the rear" relate in the text which follows, unless defined otherwise, to the insertion direction, wherein "at the front" refers to a region which is at the front in the insertion direction or a direction in the insertion direction.

A so-called push-pull function is provided by the interaction according to the invention of the unlocking means and the locking means. When the plug part is pushed into the socket part, locking to the socket part takes place automatically, while unlocking takes place automatically in the case of extraction by pulling the unlocking means. It goes without saying that a blocking apparatus can additionally be provided, it being possible for the unlocking function to be blocked by said locking apparatus, so that the plug-in connection is additionally secured against being unintentionally removed.

It is understood that unlocking means and locking means can interact, in principle, directly or indirectly, that is to say by means of at least one further component. However, the unlocking means preferably interacts directly with the locking means since, in this way, the number of components required can be reduced. A relatively robust design is generally also possible with the structure as simplified in this way.

The locking means preferably has at least one, in particular metal, latching tongue which is fastened to the plug housing by way of a fastening section. The latching tongue has a free latching end which preferably extends toward the front in the insertion direction and advantageously has a latching projection which is directed away from the plug housing. The latching projection can be formed, for example, by angled-away portions of the latching tongue. As an alternative, the latching end itself can provide a latching edge and it is understood that the free end of the latching tongue can also extend toward the rear, against the insertion direction, depending on requirements.

The free latching end is intended and designed to latch with a latching means on the socket part. The free latching end can preferably move in a direction transverse to the insertion direction with respect to the plug housing, preferably with a spring action. The fastening section is preferably designed on a longitudinal end of the latching tongue, which end is situated opposite the latching end. The latching tongue can be, for example, driven into, snapped into, screwed or fastened in some other way to the plug housing by way of the fastening section.

In variants, the locking means can, for example, also be in the form of a latching recess which can be latched to a latching tongue of the socket part. However, it is advantageous for the moving parts of the locking means to be formed on the plug part, which is easier to replace, than on the socket part which is often permanently installed.

The at least one latching tongue and the unlocking means are advantageously designed and interact in such a way that the free latching end can move toward the plug housing as a result of displacement of the unlocking means with respect to the plug housing against the insertion direction. To this end, one region of the latching end can be provided with a, for example ramp-like, control surface onto which the unlocking means slides when it is withdrawn against the insertion direction, and therefore forces the latching end in the direction of the plug housing. When the plug part is inserted into the socket part, the socket part can interact with the control surface in the same way in order to insert the latching end into a corresponding latching recess. The control surface may be formed on the latching projection.

In variants, the latching end can also be moved away from the plug housing when the unlocking means is withdrawn. However, embodiments of this kind are generally more complicated in respect of structure in order to ensure latching with corresponding latching means on the socket part.

The locking means preferably comprises a, in particular metal, U-shaped clip which is fastened to the plug housing in a fixed position in the insertion direction and has two largely identical latching tongues, each with a free latching end. The U-shaped clip preferably at least partially surrounds the plug housing, wherein the two latching tongues preferably extend toward the front in the insertion direction, in particular along the plug housing, on opposite sides of the plug housing by way of their free latching ends. Therefore, reliable locking on both sides of the plug part can be ensured in a structurally simple manner. It is understood that, in variants, two separate latching tongues can also be arranged on either side of the plug housing, said separate latching tongues not being connected to one another by means of a clip. However, the structural advantages of a single-part variant are immediately apparent.

The unlocking means is advantageously in the form of a sliding sleeve which fully or partially surrounds the plug housing. If the at least one latching tongue is present, it is preferably arranged between the sliding sleeve and the plug housing and, by way of its latching end, protrudes outward, substantially transverse to the insertion direction, at least partially through a recess which is formed in a side wall of the sliding sleeve. If a latching projection is formed on the latching tongue, the latching projection preferably protrudes outward.

In the case of two latching tongues, said latching tongues are preferably arranged with mirror-image symmetry on the opposite sides of the plug housing. In this case, the sliding sleeve has a corresponding recess on the opposite side walls for each latching end and, respectively, for each latching projection.

In variants, the latching tongue, for example by way of the free latching end, can also protrude beyond the sliding sleeve in the insertion direction, so that no recesses need to be present on the sliding sleeve. In this case however, the latching tongue is generally not very well protected, this possibly resulting in the plug part not being particularly robust overall in outdoor applications in particular.

In order to ensure that the unlocking means is reset to an inoperative position, the unlocking means is advantageously prestressed in the insertion direction and is supported on the plug housing with a spring action by means of a stop. In this case, the stop is preferably fastened to the plug housing as a separate component and such that it can be removed as required. This ensures that the unlocking means is always reset to the inoperative position in the absence of external forces, it being possible for said unlocking means to be displaced toward the rear against the insertion direction in order to release locking.

The removable stop has the advantage of simplifying the assembly of the plug part by, for example, the unlocking means, which is in the form of a sliding sleeve, being pushed onto the plug housing, provided with a spring and being fixed by the stop. It is understood that the unlocking means can also be mounted on the plug housing without prestress, wherein it can be reset to the inoperative position, for example manually, in this case.

In the inoperative position, the unlocking means is preferably displaced fully toward the front as far as a front stop, which delimits the displacement path and is arranged, in particular, fixed to the housing, with respect to the plug housing.

The locking means described in the present case and also the unlocking means, in particular jointly, can advantageously also be used in a large number of plug parts of the general kind advantageously in a manner unconnected to the other aspects of the invention.

It has proven particularly advantageous to provide a second open position of the protective apparatus, in which open position the protective apparatus remains in the absence of external forces. This has the advantage that the protective apparatus can be moved to the second open position, for example, for manipulation of the plug insert or of the plug pins. In this case, it is advisable to design the first open position differently from the second open position, so that the protective apparatus cannot remain in the second open position when the plug part is removed from the socket part. This means, in particular, that the protective apparatus is preferably designed in such a way that the intended interaction with the socket part during insertion or removal prevents the protective apparatus from reaching the second open position.

It is understood that the protective apparatus can also have only one open position, in which case, for example, separate arresting of the first open position can be provided for manipulations of the plug pin.

The protective apparatus preferably comprises a closure flap which, in particular, is in the form of a cap and, in the closed position, can be pressed against the plug housing as a termination of an end-face opening in an interior of the plug housing. The plug insert with the plug pins received therein is arranged in the interior. The end-face opening is formed in the plug housing at the front in the insertion direction. In variants, the protective apparatus can also be in the form of, for example, roller blind-like slides with which the opening can be closed only by displacement.

A sealing element which seals off the termination of the interior from dirt and/or moisture is preferably present on the closure flap. As an alternative, the sealing element can also be formed on the plug housing, for example in a groove in the front end face of the plug housing. The sealing element is preferably in the form of an O-ring which is composed of a suitable sealing material, such as a rubber seal for example. In this case, the shape of the O-ring can be matched to the specific shape of the plug housing and/or of the closure flap. There is also no need to provide a sealing element, depending on the application.

The closure flap is advantageously mounted on the plug part in a pivotable and/or displaceable manner by means of a guide element which is guided in a guide slot in the plug part. The closure flap preferably comprises at least one control element which can interact or interacts with a control surface of the socket part during insertion of the plug part in such a way that the closure flap can be moved from the closed position to the first open position during insertion.

In this case, the guide slot in the plug part extends along the plug housing preferably largely in the insertion direction and advantageously has a stop, against which the guide element bears in the closed position, in a front region.

In the case of simultaneous displaceability and pivotability of the closure flap, said closure flap can advantageously be moved from the closed position to the first open position with a superimposed displacement and pivoting movement. In particular, the closure flap can be pivoted out of the closed position and at the same time can be displaced toward the rear parallel to a side surface, called the upper face, of the plug housing. In the first open position, the closure flap is preferably oriented largely parallel to the upper face and displaced toward the rear with respect to the plug housing.

Two guide slots are preferably provided on the plug housing, said guide slots being formed on opposite sides and substantially with mirror-image symmetry. In this case, the closure flap also has two correspondingly arranged guide elements which engage into in each case one of the guide slots.

The guide slot advantageously has sections which are offset relative to one another with respect to the guide direction, so that the closure flap can be moved toward the plug housing or away from said plug housing in the event of displacement, preferably in a positively controlled manner, at least in the region of the guide element. As a result, the space required by the closure flap to make the transition from the closed position to the first open position can be minimized, and therefore the socket part can be designed in as space-saving a manner as possible. A rear section is preferably recessed in relation to the front section with respect to the upper face, that the closure flap is arranged closer to the plug housing at least in the region of the guide element than in the front section in the first open position. It is understood that the guide slot can also be designed in a rectilinear manner given a sufficient amount of space in the socket part.

The plug part preferably comprises a resetting apparatus for the closure flap, which resetting apparatus preferably comprises a push element to which a spring force is applied in the insertion direction. The resetting apparatus interacts with the closure flap in such a way that the closure flap can be reset or is reset from the first open position to the closed position in the absence of external forces.

The resetting apparatus preferably interacts with the closure flap in such a way that said closure flap is pressed against the end-face opening into the closed position, possibly in a manner displaced right to the front in the guide slot. This can be achieved by means of a correspondingly designed spring cam of the closure flap, which spring cam has a control surface which interacts with the push element.

If the protective apparatus is in the second open position, the push element preferably interacts with the protective apparatus in such a way that the resetting apparatus arrests the protective apparatus when said protective apparatus is in the second open position. The second open position can preferably be reached from the closed position by substantially pure pivoting. To this end, the spring cam can be designed in such a way that there is a dead center with respect to the pivoting movement of the closure flap between the closed position and the second open position.

The plug insert is preferably supported on the plug housing with a spring force applied in the insertion direction. Therefore, a spring force can act on a plurality of plug pins at the same time in a simple manner in order to ensure a good plug connection. It goes without saying that, in this case, the individual plug pins can be supported on the plug insert by means of additional spring elements in order to compensate for individual irregularities. An overall contact-pressure force of the individual plug pins is therefore given by a combination of the spring forces from the housing onto the plug insert and from said plug insert onto the individual plug pins themselves.

The plug insert is preferably designed to receive a plurality of, in particular four, plug pins, wherein a plurality of plug pins, preferably four, are preferably arranged in the plug insert. It is understood that the plug insert can in this case receive plug pins for electrical and/or optical conductor connections, so that a so-called hybrid plug is produced overall.

Advantageously, half of the plug pins are in the form of male plug pins and half are in the form of female plug pins when there is an even number of plug pins in the plug insert. In this case, "male" refers to a plug-like element, while "female" refers to a socket-like element. In other words, the plug insert is preferably fitted with plug pins in such a way that a hermaphroditic plug insert is produced overall.

The plug insert described in the present case and mounting of said plug insert in the plug housing and also the arrangement and design of the individual plug pins can advantageously also be used in a large number of plug parts of the general kind in a manner unconnected to the other aspects of the invention.

In order to allow a plug-in connection which is suitable for outdoor applications, the plug part has a termination means which is designed to close an insertion opening in the socket part. The termination means closes the insertion opening when the plug part is fully inserted into the socket part. The termination means is preferably in the form of a rib which runs fully or partially around the plug housing in a plane perpendicular to the insertion direction. An external border of the rib in this plane is designed in accordance with the insertion opening in this case.

A sealing element is preferably arranged on the termination means in such a way that the insertion opening in the socket part can be sealed off against dirt and/or moisture by the termination means together with the sealing element. In this case, the sealing element can be produced as an O-ring which is composed of a suitable sealing material, such as a rubber seal for example. The sealing element can be pressed against an inner wall or against an element of the socket part, which element is specially provided for this purpose, in order to provide sealing in the inserted state. However, in the case of interior applications, it is often the case that no sealing element or no termination means at all need to be provided since soiling or wetting of the plug-in connection can be precluded with a sufficient degree of reliability.

The termination means is advantageously formed on the plug part in such a way that the locking apparatus is arranged on the plug part entirely in a region which is situated behind the termination means with respect to the insertion direction. As a result, the termination means does not need to have any passages for the locking apparatus, and therefore substantially continuous sealing termination of the insertion opening can be achieved.

The plug part preferably has a coding means which can interact with coding means on the socket part. The coding means allows the plug part to be inserted into the socket part on account of the interaction with a coding means on the socket part only with corresponding complementary design of the two coding means.

The coding means is preferably formed on the unlocking means, which is simple to replace, and comprises ribs and/or grooves which are oriented, in particular, in the insertion direction. In addition, the coding means can also be color-coded.

The coding means is preferably formed on the unlocking means when a lower face of the plug part is situated opposite the upper face of the plug housing. It is understood that the coding means does not have to be arranged on the unlocking means and can also be formed, for example, on the plug housing, wherein the entire plug part would have to be replaced in order to change a coding in this case. An arrangement on the lower face ensures that no additional space needs to be provided for the coding means in the region of the protective apparatus or the locking apparatus.

The present invention also relates to a socket part for a plug-in connection, in particular of optical conductors, comprising a socket housing having a receiving space for a plug part according to one of the embodiments described in the present case, into which socket housing the plug part can be inserted through an insertion opening in an insertion direction. The socket part has control means for interacting with a protective apparatus, in particular with a control element of the protective apparatus, of the plug part, it being possible for the protective apparatus to be moved from a closed position to an open position by said control means during insertion. In this case, the control means are formed, in particular, in the receiving space. The socket part is distinguished in that it has latching means for latching the locking apparatus of the plug part, wherein the latching means is preferably in the form of at least one cutout in a side wall of the socket housing, it being possible for the free latching end of the at least one latching tongue or possibly the latching projection to be inserted into said cutout during insertion of the plug part. In this case, the recess advantageously has a latching edge to which the locking apparatus can latch.

A plug insert having at least one plug pin for receiving a conductor, in particular an optical conductor, can be arranged in the receiving space, depending on the use of the socket part. However, it is understood that the socket part can also be designed to receive a plug part on both sides, as a central part of a plug-in connection with two plug parts. The socket part may be in the form of a built-in socket for mounting in a housing. It is likewise understood that a socket part can also be correctly directly connected to a cable.

The cutout in the socket part can be in the form of, for example, an opening which passes completely through the side wall or else only as a recess in the side wall into which a corresponding latching means, such as the latching tongue of the locking apparatus of the plug part for example, can engage. In addition, a viewing window can be provided on the socket part, it being possible to visually verify that the plug part is fully inserted into the socket part through said viewing window. A region of the plug part can, for example, be colored, wherein the color marking can be seen through the viewing window in the socket part only when said plug part is fully inserted.

The control means preferably comprises a control surface which is formed on an inner wall of the receiving space and on which a control element of the protective apparatus of the plug part can slide during insertion. In this case, the control surface can be in the form of a positive guide, for example in a guide slot, or else in the form of a guide surface which acts on one side.

A coding means is advantageously present on the socket part, wherein the coding means is fastened to the socket part in a replaceable manner. The coding means is, in particular, in the form of part of a housing wall of the socket housing and is fastened in a corresponding recess, preferably by means of a snap-action apparatus, in the housing wall of the socket housing. The coding means ensures that insertion of the plug part, in particular of a plug part having a coding means as described above, into the socket part as a result of interaction with a coding means of the plug part is possible only given a corresponding complementary design of the two coding means.

The coding means is preferably of U-shaped design, in such a way that it terminates flush with a housing outer face when it is received in the recess. In this case, the coding means is preferably fitted to a lower face of the socket housing, that is to say to a region of the socket part in which the lower face of the plug part is arranged in the inserted state.

The receiving space preferably has a stop, which runs around the inner wall, in the region of the insertion opening, said stop being in the form of, in particular, a stop for a termination means of the plug part. This prevents the plug part from being able to be inserted too far into the socket part. The stop is preferably in the form of a step in the receiving space, which step runs around the inside of a plane perpendicular to the insertion direction.

A closure means, in particular a closure flap, is preferably formed on the socket part, said closure means being mounted on the socket part in a pivotable and/or displaceable manner by means of a guide element which is guided in a guide slot in the socket part. The closure means of the socket part can be moved to a closed position in which said closure means closes the insertion opening, and can be moved to an open position in which said closure means is received in a correspondingly designed receiving space or in correspondingly designed guide grooves in the socket part.

In the case of a closure flap, the receiving space or the guide grooves are preferably arranged largely parallel to the guide slot in the closure flap of the socket part. The receiving space or the guide grooves are open at the insertion opening, so that the closure flap can be pushed into the receiving space or the guide grooves in the manner of a drawer when said closure flap is pivoted out of the closed position to an intermediate position. In the intermediate position, the closure flap of the socket part is arranged largely parallel to the guide grooves or to the receiving space. The guide slot and the receiving space or guide grooves preferably extend in the insertion direction.

The closure flap preferably has a sealing element. The sealing element runs around the closure flap, preferably on the casing side with respect to the insertion direction, and is pressed against an inner wall at the insertion opening when the closure flap of the socket part is in the closed position. In principle, the closure means can also be designed in another way, for example in the form of a roller blind-like slide. However, a design as a flap has the advantage of a particularly simple and space-saving structure. It is understood that functionally corresponding seal means are preferably present with each type of closure means.

The invention also relates to a plug-in connection, in particular for optical conductors, comprising a plug part as described in the present case and also a socket part as described in the present case.

In this case, the plug part and the socket part are preferably designed in such a way that the unlocking means of the plug part is arranged at least partially between the plug housing and a side wall of the socket part when the plug part is fully inserted into the receiving space. In this case, the locking means, in particular by way of the free latching end of the latching tongue, preferably projects through the recess in the unlocking means, and engages in a latching manner into the latching means of the socket part, said latching means preferably being in the form of a cutout in a side wall of the socket part. A side wall of the unlocking means is therefore preferably arranged in a sandwich-like manner between the plug housing and the side wall of the socket part. As described above, the unlocking means is preferably in the form of a sliding sleeve in this case.

Further advantageous embodiments and combinations of features of the invention can be gathered from the following description of a detail and from all of the patent claims.

Figure 2:
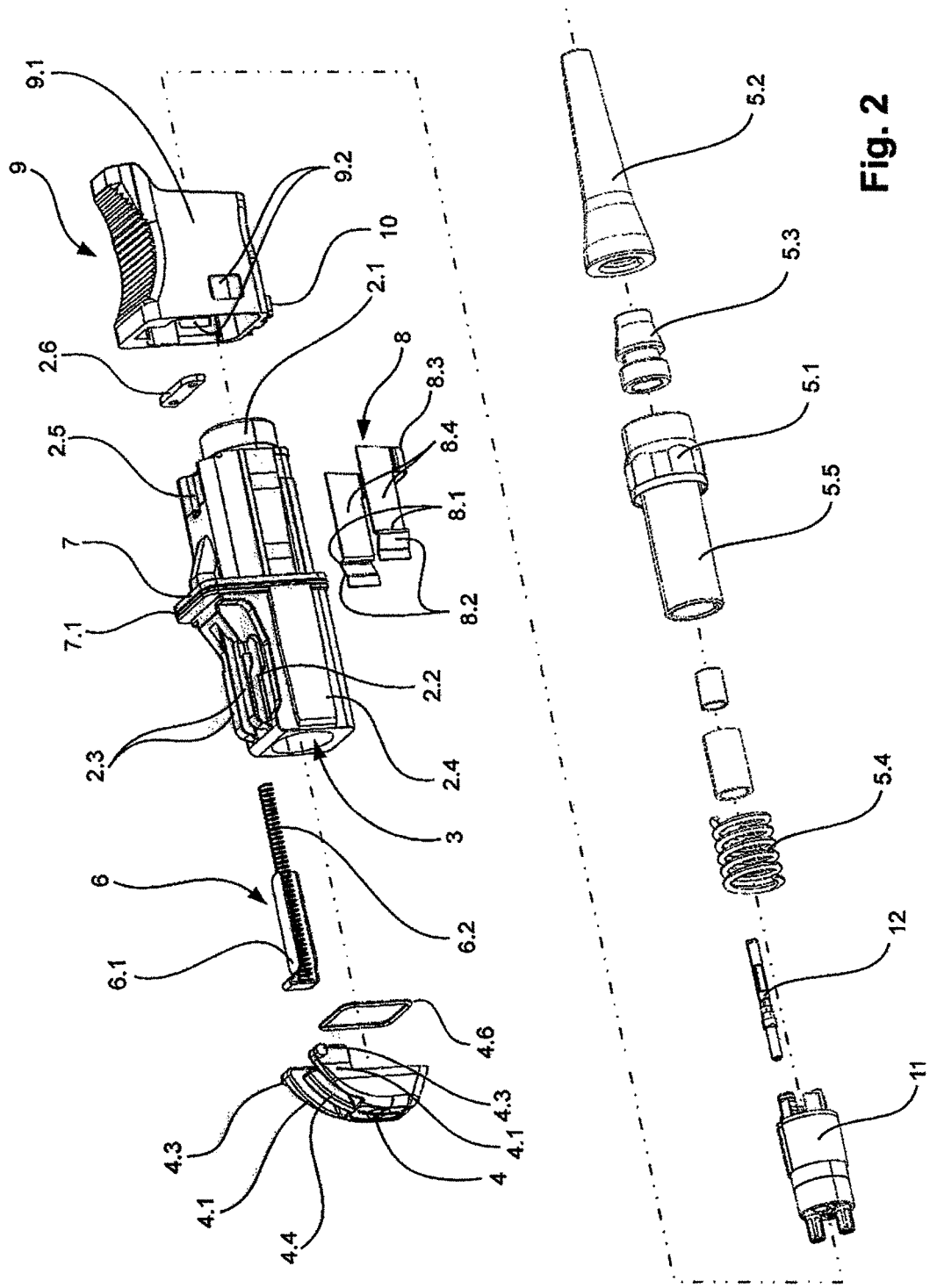
Figure 3A:
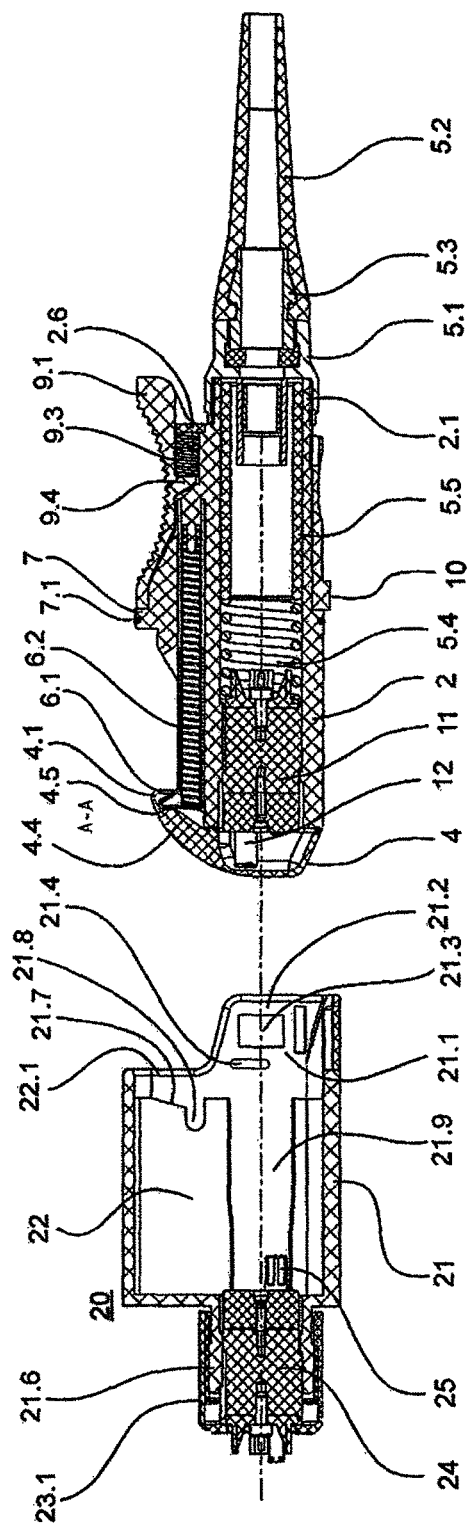
Figure 3B:
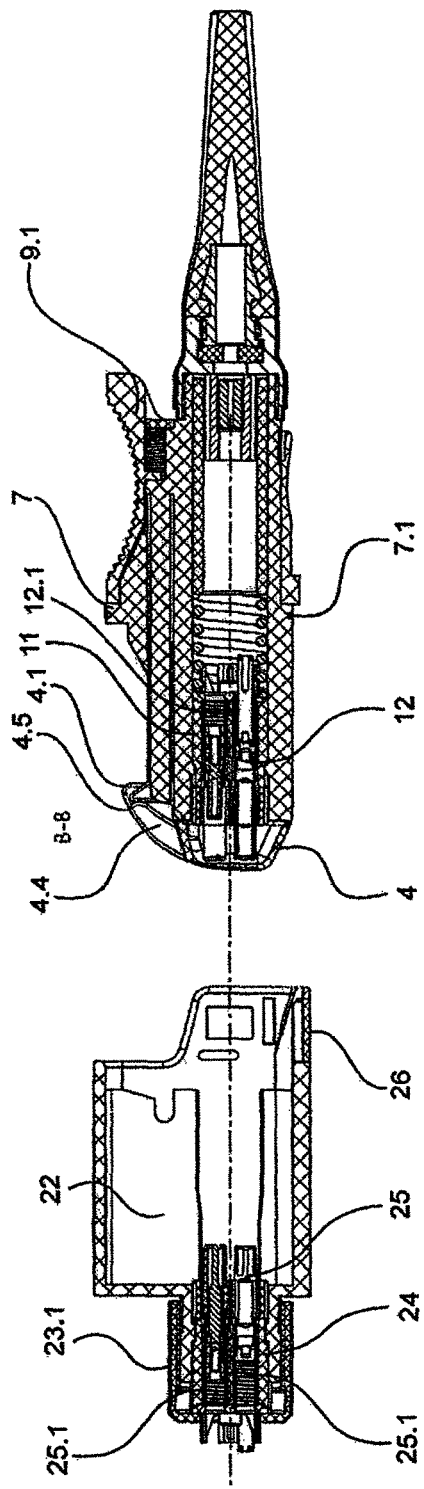
Figure 4A:
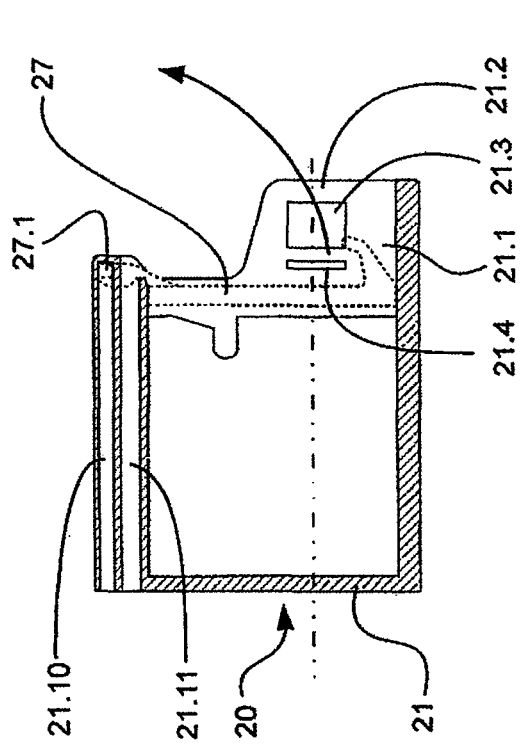
Figure 4B:
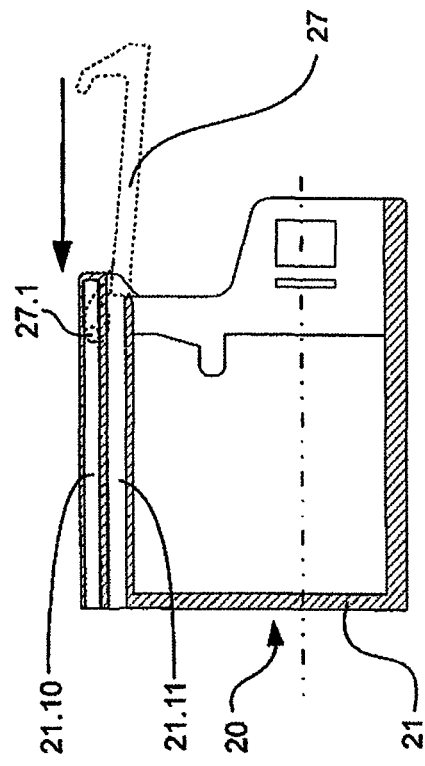
Figure 3C:
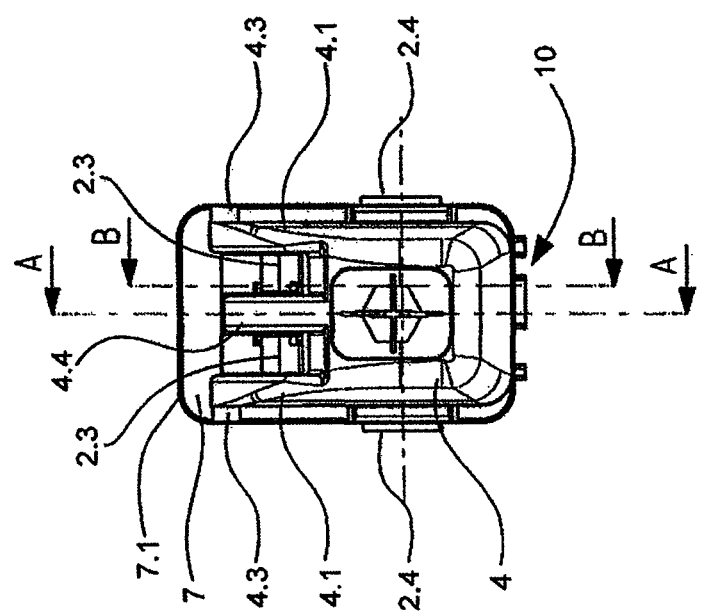
Figure 5A:
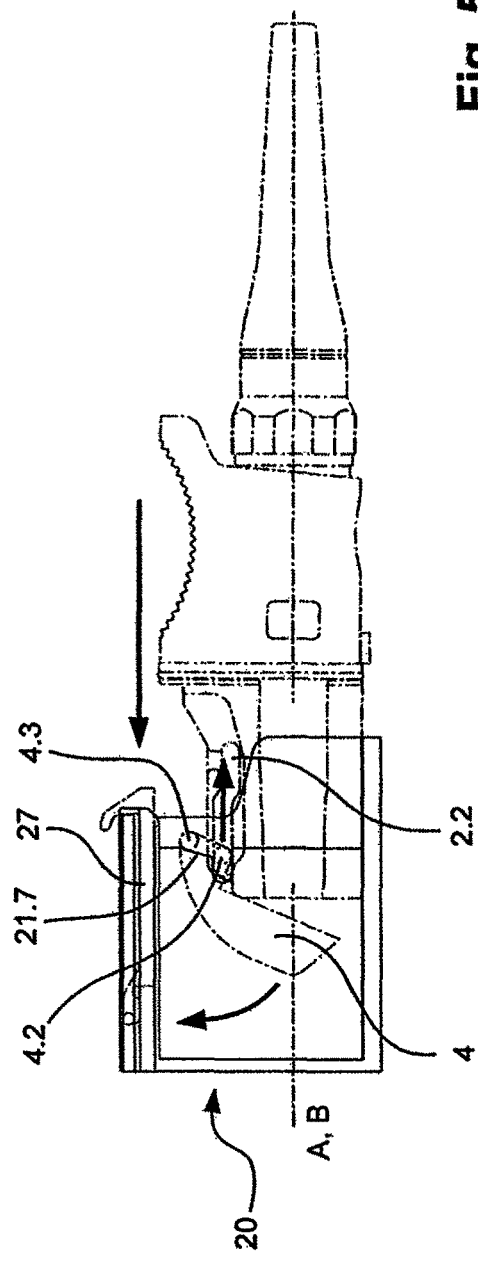
Figure 5B:
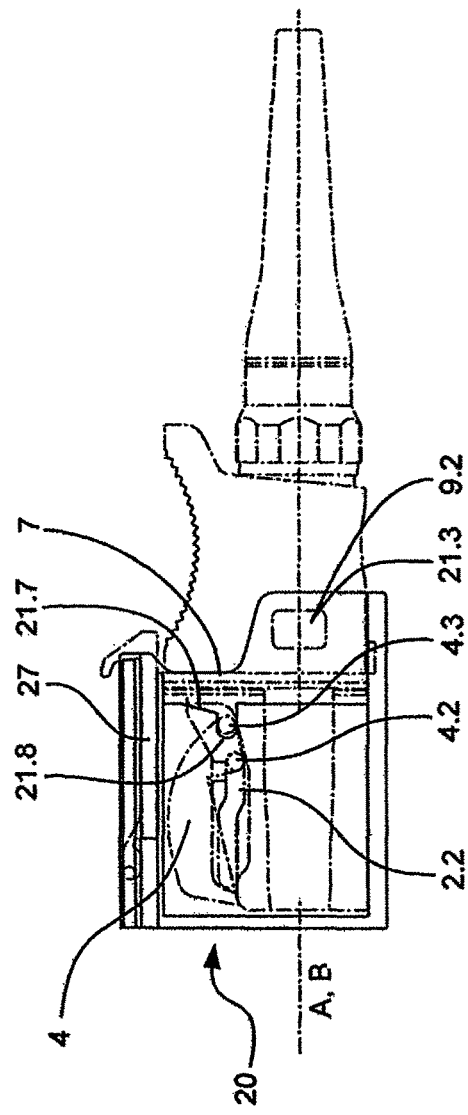

In the drawings which are used to explain the exemplary embodiments:

FIG. 1 schematically shows an external oblique view of a plug part according to the invention and also of a socket part;

FIG. 2 schematically shows an exploded illustration of a plug part according to FIG. 1;

FIG. 3a schematically shows a sectional view in the longitudinal direction through the plug part and also the socket part of FIG. 1 in a first plane;

FIG. 3b schematically shows a sectional illustration in the longitudinal direction through the plug part and also the socket part of FIG. 1 in a further plane;

FIG. 3c schematically shows a front view of the plug part according to FIG. 1;

FIG. 4a schematically shows a sectional view through a further embodiment of a socket part with a closure flap (closed);

FIG. 4b schematically shows a sectional view through the socket part of FIG. 6 with a closure flap (partially open);

FIG. 5a schematically shows a sectional view through the plug part when it is inserted into the socket part according to FIG. 4a or 4b;

FIG. 5b schematically shows a sectional view which is analogous to FIG. 5a with the plug part fully inserted; and FIG. 5c schematically shows a plug part according to FIG. 1 with the closure flap in the second open position.

FIG. 1 shows an external oblique view of a plug part 1 according to the invention and also a socket part 20. In the present case, "at the front" and "toward the front" refer to a direction in the insertion direction, that is to say a direction in which the plug part 1 is inserted into the socket part 20. Conversely, "at the rear" and "toward the rear" refer to a direction against the insertion direction. "At the top" and "toward the top" refer to a direction perpendicular to the insertion direction and, in the present case, are prespecified by the opening movement of a closure flap of the plug part.

According to current convention, the closure flap is pivoted upward in order to be opened. Accordingly, "at the bottom" is defined as the opposite direction. In respect of the socket part, said directions are defined by means of the correctly inserted plug part. In the present case, the insertion direction A coincides with a longitudinal direction B of the plug part 1. Likewise, a longitudinal direction C of the socket part 20 coincides with the insertion direction A and also the longitudinal direction B in the inserted state. It is understood that this does not necessarily have to be the case.

The plug part 1 comprises an elongate housing 2 with a substantially rectangular cross section. In a longitudinal direction B of the housing 2, that is to say in insertion direction A in the present case, a hollow space 3 which is open at the two longitudinal ends of the housing 2 is designed in order to receive a plug insert 11. Parts of a holding apparatus 5 for the plug insert 11 project toward the rear out of the hollow space 3 from a rear longitudinal cable end. The holding apparatus 5 is fastened to a tubular fastening connection piece 2.1 of the housing 2 by way of a coupling nut 5.1. In this case, the holding apparatus 5 comprises a kink-prevention sleeve 5.2, which is connected to the coupling nut 5.1, in order to guide the cable into the plug part 1 in a protected manner. A clamping neck 5.3 relieves the strain on the cable.

A closure flap 4, which is in the form of a cap, is arranged at the front of the housing 2, said closure flap bearing against a front end face of the housing 2 and largely completely covering said end face in a closed position. An end-face front opening in the hollow space 3 is closed off to the outside by the closure flap 4. The closure flap 4 has two upwardly projecting side cheeks 4.1 on each of which a guide cam 4.2 which is directed inward, in the direction of the housing 2, is formed (see, for example, FIGS. 5a-5c). The guide cams 4.2 are displaceably and pivotably guided in a respective guide groove 2.2, said guide grooves being formed on either side of the housing 2. In insertion direction A, the guide grooves 2.2 each have a stop at the front (see FIG. 2) against which the guide cams 4.2 rest in the manner of a bearing when the closure flap 4 is displaced fully toward the front.

Control cams 4.3 are formed on the ends of the side cheeks 4.1 on the outside, that is to say in a manner directed away from the housing 2, it being possible for said control cams to interact with a control surface of the socket part 20 in order to pivot or displace the closure flap 4 (see, for example, FIGS. 5a-5b). The control cams 4.3 are spaced apart from the guide cams 4.2, and therefore a torque can be exerted by means of the control cams 4.3 in respect of a geometric pivot axis which is defined by the guide cams 4.2. Control cams 4.3 and guide cams 4.2 are oriented transverse to the insertion direction A.

A spring cam 4.4 is arranged between the side cheeks 4.1, said spring cam forming a lever arm with respect to the geometric pivot axis of the guide cams 4.2 and being fixedly connected to the closure flap 4. The spring cam 4.4 is supported against a front end surface of a push element 6.1 of a resetting apparatus 6 which is formed on the housing 2. The push element 6.1 is guided in a displaceable manner on the plug housing 2 in insertion direction A and a spring force is applied to said push element toward the front by a helical spring 6.2 (see FIG. 2 or 3a). The push element 6.1 is guided between two side cheeks 2.3 which are formed on the upper face of the housing 2 and on the outside of which the guide grooves 2.2 are formed.

The push element 6.1 acts on the spring cam 4.4 in such a way that the closure flap 4 is firstly displaced into the guide grooves 2.2 fully toward the front against the front stops of the guide cams 2.2 by the guide cams 4.2. Secondly, the closure flap 4 is pivoted about the guide cams 4.2 on account of the spring cam 4.4 which acts as a lever arm, and said closure flap is therefore pressed onto the end surface of the housing 2. Therefore, the resetting apparatus 6 forces the closure flap 4 into a closed position in the absence of external forces (see FIGS. 5a-5c in this respect).

A respective guide strip 2.4 which is formed in the insertion direction is formed on either side of the housing 2, it being possible for said guide strip to interact with a corresponding guide groove 21.9 in the socket part 20 in order to center and to guide the plug part 1 (see FIGS. 3a-3b).

The housing 2 has a rib 7 approximately in the center of the insertion direction A, said rib extending fully around the housing 2, apart from a lower face of the housing 2, in a plane perpendicular to the insertion direction A. In this case, the rib 7 serves as a termination means for closing an insertion opening 22.1 in the socket part 20 when the plug part 1 is inserted fully into the socket part 20.

A groove runs around the casing of the entire housing 2 on the rib 7 and also the lower face of the housing 2. A sealing element 7.1 which runs all the way around, is substantially in the form of an O-ring and with which an insertion opening 22.1 in a receiving space 22 of the socket part 20 can be sealed off by said sealing element being pressed against an inner wall of the receiving space 22 is arranged in the groove. The rib 7 separates a plug section, which is arranged in front of the rib 7, from a holding or handle section which is arranged behind the rib 7.

A locking means 8 and also an unlocking means 9 are arranged behind the rib 7 in the holding region. The unlocking means 9 comprises a sliding sleeve 9.1 which is displaceably mounted on the housing 2 in relation to said housing in the insertion direction A. In an inoperative position, the sliding sleeve 9.1 is displaced fully toward the front and adjoins the rib 7 from the rear. The sliding sleeve 9.1 surrounds the plug housing 1 largely completely in the holding region in the inoperative position. A spring force is applied to the sliding sleeve 9.1 toward the front by means of a spring element 9.3 (see, for example, FIGS. 3a-3b), and therefore the sliding sleeve 9.1 is adjusted to the inoperative position in the absence of external forces.

A coding means 10 is formed on a lower face of the sliding sleeve 9.1 in a front region, said coding means in the present case comprising longitudinal ribs which are oriented in the insertion direction A (also see FIG. 3c). The sliding sleeve 9.1 has a finger recess with transverse ribs on an upper face in order to allow a user to grip said sliding sleeve without slipping during handling.

The locking means 8 comprises latching projections 8.1 which are arranged on both sides of the housing 2 and project outward substantially transverse to the insertion direction A. In this case, the latching projections 8.1 are mounted on the housing 2 such that they can move, in particular with a spring action, in a direction transverse to the insertion direction. The latching projections 8.1 project from inside the sliding sleeve 9.1, through recesses 9.2 in the sliding sleeve 9.1, to the outside. In relation to the insertion direction A to the rear, the latching projections 8.1 each have a latching surface which is arranged largely perpendicular to the insertion direction A. In the insertion direction A toward the front, the latching projections 8.1 each have a ramp-like control surface 8.2 which meets the housing 2 toward the front in the manner of a wedge. The control surfaces 8.2 pass through the recess 9.2 in such a way that they are arranged downstream of front edges of the recesses 9.2 in insertion direction A. When the sliding sleeve 9.1 is withdrawn with respect to the housing 2, the front edges of the recesses 9.2 can therefore slide on the respective control surface 8.2.

The socket part 20 is illustrated in front of the plug part 1 in insertion direction A in FIG. 1. The socket part 20 has a housing 21 in which the receiving space for receiving the plug part 1, in particular the plug section which is arranged in front of the rib 7, is formed. The receiving space 22 has an insertion opening 22.1 for inserting the plug part 1.

In a region which is situated opposite the insertion opening 22.1 in the insertion direction A, the socket part 20 has an external end surface 21.5 which is oriented perpendicular to the insertion direction A. The end face 21.5 is in the form of a mounting surface for mounting the socket part 20, for example, in a housing. A tubular fastening connection piece 21.6 for a holding apparatus 23 of a plug insert 24 is formed on the outside of the end surface 21.5 (see FIGS. 3a and 3b). The holding apparatus 23 comprises a coupling nut 23.1 with which the plug insert 24 is held in the socket part 20.

In a region which is situated at the bottom, the housing 21 of the socket part 20 has a housing projection 21.1 which has a U-shaped cross section and extends beyond the insertion opening 22.1 in the insertion direction A. The U-shaped projection 21.1 has side cheeks 21.2 in which a respective latching recess 21.3 is formed. The latching projections 8.1 of the plug part 1 can latch into the latching recesses 21.3. A cutout in the projection 21.1 is formed beneath the latching recesses 21.3, a replaceable coding means 26 being inserted into said cutout. The coding means 26 ensures that only a plug part 1 with a complementary coding means 10 can be fully inserted into the socket part 20. Viewing windows 21.4 are formed in front of the latching recesses 21.3 in the insertion direction, the sliding sleeve 9.1 being visible through said viewing windows, for example for visual monitoring, only when the plug part 1 is correctly fully inserted.

The U-shaped projection 21.1 is designed in such a way that it surrounds the unlocking means 9, that is to say the sliding sleeve 9.1 in the present case, in a U-shaped manner from below when the plug part 1 is fully inserted into the socket part 20. During insertion, edges of the side cheeks 21.2, which edges face the plug part 1, slide onto the control surfaces 8.2 of the latching projections 8.1 and force said latching projections inward in the direction of the housing 2. When the plug part 1 is fully inserted, the latching recesses 21.3 are arranged in the direction transverse to the insertion direction A in alignment with the recesses 9.2. The latching projections 8.1 can therefore project into the latching recesses 21.3 and engage in said latching recesses by way of the latching surfaces in a latching manner. The plug part 1 is therefore secured against unintentional removal from the socket part 20.

If the sliding sleeve 9.1 is displaced toward the rear, for example when a user grasps the plug part 1 on the sliding sleeve 9.1 and pulls it against the insertion direction A, the front edges of the recesses 9.2 in the sliding sleeve 9.1 slide onto the respective control surfaces 8.2 of the latching projections 8.1. In this case, the latching projections 8.1 are forced inward, in the direction of the housing 2, as a result of which they are moved out of the latching recesses 20.3 in the socket part 20. The plug part 1 is therefore unlocked and can be removed from the socket part 20.

FIG. 2 shows an exploded illustration of the plug part 1 according to FIG. 1. FIG. 2 shows, in particular in detail, the design of the resetting apparatus 6, the guide grooves 2.2 and also the design of the locking means 8 and also of the unlocking means 9.

The closure flap 4 has a sealing element 4.6 which is arranged on a surface of the closure flap 4 which faces the front end face of the housing 2. The termination of the hollow space 3, which termination extends through the closure flap 4, is therefore sealed off against the ingress of dirt or moisture at the end face.

The push element 6.1 of the resetting apparatus 6 is in the form of a U-shaped clip which is oriented in the insertion direction. The helical spring 6.2 is arranged between the arms of the clip 6.1. The helical spring 6.2 is supported on the housing 2 toward the rear in the longitudinal direction B between the side cheeks 2.3.

The locking means 8 comprises a U-shaped clip 8.3 which partially surrounds the housing 2 from the bottom behind the rib 7 and is fastened to, for example snapped into, said housing. Starting from the arms of the U-shape, two latching tongues 8.4 extend toward the front along the housing 2 in insertion direction A. The latching projections 8.1 are formed at the front, free longitudinal ends of the latching tongues 8.4. The housing 2 has corresponding cutouts into which the clip 8.3 can be snapped and which provide the latching tongues 8.4 with the requisite mobility in the direction perpendicular to the insertion direction A.

The latching tongues 8.4 are of spring-elastic design, and therefore the latching projections 8.1 are pressed outward through the cutouts 9.2 in an inoperative position in the absence of external forces. Clips 8.3 and latching tongues 8.4 are preferably integrally produced from a resilient metal.

The sliding sleeve 9.1 is pushed onto the housing 2 from the rear over the clip 8.3 and the latching tongues 8.4. The clip 8.3 and the latching tongues 8.4 are arranged between the sliding sleeve 9.1 and the housing 2 in a protective manner in this way. A cutout 2.5 for the spring element 9.3 is provided in the holding region on an upper face of the housing 2 (also see FIGS. 3a-3b). The cutout 2.5 is open toward the rear and is closed off in this direction by a stop 2.6 which is fastened to the housing 2 in a removable manner. The spring element 9.3 is supported on the unlocking means 9.1 by means of a driver 9.4 and on the housing 2 by means of the stop 2.6. Assembly of the unlocking means 9 is particularly simple owing to the removable stop 2.6.

FIG. 2 further shows the plug insert 11 which is designed to receive four plug pins 12 which are arranged in a regular fashion about the longitudinal direction B (also see FIGS. 3a-3b in this respect). The plug insert 11 is arranged in the hollow space 3 such that it can be displaced in insertion direction A and a spring force is applied to said plug insert in a direction toward the front by means of a spring element 5.4 in relation to the housing 2. The spring element 5.4 is supported on the housing 2 by means of a spacer sleeve 5.5 and the coupling nut 5.1. In this way, the entire plug insert 11 is arranged with a spring action in the hollow space 3 of the housing 2 in a manner prestressed toward the front, as a result of which optical connection to connections of the socket part 20 can be ensured. A stop in the hollow space 3 prevents the plug insert 11 from being able to fall out of the hollow space 3 toward the front. The individual plug pins 12 are likewise provided with spring elements 12.1 by means of which they are supported against the plug insert 11. Individual deviations can be compensated for in this way.

FIG. 3a shows a sectional view through a longitudinal center plane of the plug part 1 and also of the socket part 20, while FIG. 3b shows a sectional view through a plane which is parallel and laterally offset with respect to said longitudinal center plane. The two planes are depicted in FIG. 3c which shows a front view of the front end face of the plug part 1 viewed in a direction against the insertion direction A. FIGS. 3a and 3b are described together in the text which follows, wherein reference is made substantially to the description of FIGS. 1 and 2 in respect of the plug part 1.

The tubular fastening connection piece 21.6 can be seen on the assembly end face 21.5 of the socket part 20. The fastening connection piece 21.6 is provided with an external thread onto which the coupling nut 23.1 is screwed. In this case, the coupling nut 23.1 fixes the plug insert 24 of the socket part 20 which is supported against a stop in the fastening connection piece 21.6 in the opposite direction. The end faces of plug pins 25 which are received in said plug insert project into the receiving space 22. The plug pins 25 are supported against the plug insert 24 by means of individual spring elements 25.1.

Respective control surfaces 21.7 are formed on the inside of the receiving space 22 on the opposite side walls of the housing 21. The control surfaces 21.7 are inclined toward the front in insertion direction A starting from a housing upper face. The control surfaces 21.7 project into the receiving space 22 in such a way that the control cams 4.3 of the closure flap 4 of the plug part 1 can interact with said control surfaces when the plug part 1 is inserted into the socket part 20. The control surfaces 21.7 project into a rectilinear guide slot 21.8 which is oriented in the insertion direction A. The guide slot 21.8 is arranged approximately at the same level as a front section of the guide slots 2.2 in the plug part 1 when said plug part 1 is inserted in the socket part 20. The guide slot 21.8 has a stop at the front in insertion direction A, said stop serving as an abutment for the control cams 4.3 of the closure flap 4.

Guide grooves 21.9 for receiving the guide strip 2.5 are formed on the side walls of the housing 21 in the receiving space 22, and therefore the plug part 1 is guided along said guide grooves during insertion. The guide grooves 21.9 and also the guide strip 2.5 meet toward the front in sections, this producing a wedge-type fit when the plug part 1 is fully inserted.

One of the side cheeks 21.2 of the U-shaped projection 21.1 with latching recess 21.3 formed in it and the viewing window 21.4 can be seen in the sectional view. Said sectional view likewise shows how the coding means 26 is inserted into the corresponding recess in the projection 21.1. Longitudinal ribs are formed on the inside of the coding means 26, said longitudinal ribs interacting with the longitudinal ribs of the coding means 10 of the plug part 1 during insertion.

FIGS. 3a and 3b show a longitudinal cross section through the spring cam 4.4 of the closure flap 4. An external border of the spring cam 4.4 is designed as a control surface in this case, said control surface sliding onto the end surface of the push element 6.1 of the resetting apparatus 6 when the closure flap 4 is pivoted. In this case, the border of the spring cam 4.4 has a tip 4.5 which defines a dead center with respect to the pivot axis which is present at that instant and is determined by the guide cams 4.2. If the closure flap 4 is pivoted to a great extent in such a way that the guide cam 4.4 slides onto the push element 6.1 by means of the tip 4.5, the closure flap 4 enters a second open position. In the second open position, the push element 6.1 interacts with the spring cam 4.4 in such a way that the closure flap 4 is latched in the second open position on account of the spring force (see FIG. 5c in this respect).

FIGS. 4a and 4b schematically show a further embodiment of the socket part 20, in which a closure flap 27 is additionally present.

The closure flap 27 is displaceably and pivotably guided in guide grooves 21.10 in the housing 21 by means of guide cams 27.1. In this case, the guide grooves 21.10 are formed above the receiving space 22 for the plug part 1 and run in the insertion direction A. A receiving space 21.11 is formed beneath the guide grooves 21.10, said receiving space running parallel to the guide grooves 21.10 and being open at the insertion opening 21.1 in insertion direction A.

FIG. 4a shows the closure flap 27 in a closed position in which the insertion opening is closed by the closure flap 27. FIG. 4b shows the closure flap in an intermediate position in which said closure flap is pivoted upward (arrow in FIG. 4a), and therefore the closure flap 27 is arranged largely parallel to the receiving space 21.11. The closure flap 27 can be pushed from the intermediate position, in the direction of the arrow, in a manner guided by means of the guide cams 27.1 in the guide grooves 21.10, into the receiving space 21.11. In this way, the closure flap 27 is received in the socket part 20 in a space-saving and protected manner.

FIGS. 5a-5b show a sequence during insertion of the plug part 1 into the socket part 20.

FIG. 5a shows a record of a moment in which the control cams 4.3 of the closure flap 4 have already slid onto the control surfaces 21.7 of the socket part 20. On account of the opposing force which is exerted by the control surfaces 21.7 onto the control cams 4.3, the closure flap 4 is pivoted about the guide cams 4.2 (arrow) and displaced toward the rear in the guide grooves 2.2 of the plug part 1. In this case, the closure flap 4 is situated with one transition edge in the direction of the front end surface of the housing 2 on its top face. During further insertion, the guide cams 4.2 slide further into the guide grooves 2.2 toward the rear, while the control cams 4.3 of the control surfaces 21.7 enter the guide slot 21.8.

FIG. 5b shows the plug part 1 in the fully inserted state. The guide cams 4.2 are displaced fully toward the rear in the guide slots 2.2, while the control cams 4.3 butt against the front stop in the guide grooves 21.8. The closure flap 4 is arranged completely above the plug housing 2 on the surface of said plug housing (first open position).

The guide slots 2.2 have a front and a rear section, which front and rear section are arranged in a manner displaced in relation to one another (also see FIGS. 1-2). The rear section is offset toward the bottom in such a way that the closure flap 4 is moved toward the housing 2 by means of the guide cams 4.2 when the guide cams 4.2 enter the rear section. As a result, an overall height of the space which is required for the opening movement of the closure flap 4 can be reduced.

The control surface of the spring cam 4.4, that is to say in particular the tip 4.5, is selected in such a way that, when the transition is made from the closed position to the first open position, the dead center which is defined by the tip 4.5 is not exceeded. This ensures that, when the plug part 1 is removed, the closure flap 4 is automatically reset to the closed position on account of the push element 6.1 to which spring force is applied. In particular, the control surface 21.7 and, respectively, the guide slot 21.8 do not have to be designed for resetting purposes as a result, this substantially simplifying the structure of the socket part 20.

FIG. 5c shows the plug part 1 with the closure flap 4 in the second open position. In the second open position, starting from the closed position, the dead center which is defined by the tip 4.5 is exceeded. The guide cams 4.2 bear against the front stops of the guide grooves 2.2. In this position, the push element 6.1 acts on the spring cams 4.4 (neither of which is illustrated) in such a way that the resulting lever action arrests the closure flap 4 in the second open position. On account of the spring cam 4.4 and/or the side cheeks 4.1 resting on the upper face of the housing 2, the closure flap 4 is prevented from being able to pivot further in the opening direction.

The invention claimed is:

1. A plug part for a plug-in connection comprising,
a plug housing, in which a plug insert having at least one plug pin for receiving a conductor, is arranged, wherein
the plug part can be inserted into a correspondingly designed socket part in an insertion direction, and comprises
locking means for releasably locking the plug part in the socket part, and further has
unlocking means, by means of which the locking of the locking means to the socket part can be released, wherein
the plug part comprises a protective apparatus for protecting an end face of the plug pin, which protective apparatus can be moved from a closed position with said end face covered to an open position with said end face exposed,
the protective apparatus can be moved from the closed position to the open position by inserting the plug part into the socket part by interacting with the socket part, and
the unlocking means is displaceably mounted on the plug housing substantially along the insertion direction, wherein the unlocking means can interact with the locking means in such a way that, in the case of longitudinal displacement of the unlocking means with respect to the plug housing substantially in the direction against the insertion direction, locking which is established by the locking means can be released.

2. The plug part as claimed in claim 1, wherein the plug part is suitable for a plug-in connection of optical conductors, comprising at least one plug pin for receiving an optical conductor.

3. The plug part as claimed in claim 1, wherein the locking means has at least one latching tongue which is fastened to the plug housing by way of a fastening section and has a free latching end.

4. The plug part as claimed in claim 3, wherein the unlocking means and the at least one latching tongue are designed and interact in such a way that the latching end can move toward the plug housing as a result of displacement of the unlocking means with respect to the plug housing against the insertion direction.

5. The plug part as claimed in claim 3, wherein the locking means comprises an, U-shaped clip which is fastened to the plug housing in a fixed position in the insertion direction and has two largely identical latching tongues, each with a free latching end, wherein the U-shaped clip at least partially surrounds the plug housing.

6. The plug part as claimed in claim 3, wherein the unlocking means is in the form of a sliding sleeve which fully or partially surrounds the plug housing, wherein the at least one latching tongue may be arranged between the sliding sleeve and the plug housing and, by way of its latching end, protrudes outward, substantially transverse to the insertion direction, at least partially through a recess which is formed in a side wall of the sliding sleeve, wherein a latching projection, formed on the latching tongue, may protrude outward.

7. The plug part as claimed in claim 1, wherein the unlocking means is supported on the plug housing in a manner prestressed in the insertion direction and spring-loaded by means of a stop.

8. The plug part as claimed in claim 1, wherein the protective apparatus can be moved to a second open position, in which the protective apparatus remains in the absence of external forces.

9. The plug part as claimed in claim 1, wherein the protective apparatus comprises a closure flap which, in the closed position, can be pressed against the plug housing as a termination of an end-face opening in an interior of the plug housing, wherein a sealing element which seals off the termination from at least one of dirt and moisture is present.

10. The plug part as claimed in claim 9, wherein the closure flap is mounted on the plug part in a pivotable and displaceable manner by means of a guide element which is guided in a guide slot in the plug part, and wherein, in the first open position, the closure flap is oriented largely parallel to a side surface, called the upper face, of the plug housing and is arranged such that it is displaced toward the rear with respect to the plug housing.

11. The plug part as claimed in claim 10, wherein the guide slot has sections which are offset relative to one another with respect to the guide direction, so that the closure flap can be moved toward the plug housing or away from said plug housing in the event of displacement, at least in the region of the guide element.

12. The plug part as claimed in claim 9, wherein the plug part comprises a resetting apparatus for the closure flap, wherein the resetting apparatus interacts with the closure flap in such a way that the protective apparatus can be reset from the first open position to the closed position in the absence of external forces, wherein in the second open position, the resetting apparatus arrests the closure flap when said closure flap is in the second open position.

13. The plug part as claimed in claim 12, wherein the resetting apparatus comprises a push element to which a spring force is applied in the insertion direction.

14. The plug part as claimed in claim 1, wherein the plug insert is designed to receive a plurality of plug pins.

15. The plug part as claimed in claim 1, wherein the plug part has termination means which are designed to close an insertion opening in the socket part.

16. The plug part as claimed in claim 15, wherein the locking apparatus is arranged on the plug part entirely in a region which is situated behind the termination means with respect to the insertion direction.

17. The plug part as claimed in claim 1, wherein a first coding means is formed on the unlocking means and a second coding means is formed on the socket part, said first coding means being able to interact with said second coding means.

18. A socket part for a plug-in connection, comprising
a socket housing having a receiving space for a plug part, into which socket housing the plug part can be inserted through an insertion opening in an insertion direction, and
the socket part has control means for interacting with a protective apparatus of the plug part, it being possible for the protective apparatus of the plug part to be moved from a closed position to an open position by said control means during insertion of the plug part into the socket part,
wherein
the socket part has latching means for latching a locking apparatus of the plug part,
and wherein said latching means is in the form of at least one cutout in a side wall of the socket housing, it being possible for a free latching end of at least one latching tongue or a latching projection of the plug part to be inserted into said cutout during insertion of the plug part into the socket part.

19. The socket part as claimed in claim 18, wherein the socket part is suitable for a plug-in connection of optical conductors.

20. The socket part as claimed in claim 18, wherein coding means is present on the socket part, wherein the coding means is fastened to the socket part in a replaceable manner.

21. The socket part as claimed in claim 18, wherein closure means is formed on the socket part, said closure means being mounted on the socket part in at least one of a pivotable and displaceable manner by means of a guide element which is guided in a guide slot of the socket part, and can be moved to a closed position in which the closure means closes the insertion opening and can be moved to an open position in which the closure means can be introduced into a correspondingly designed receiving space in the socket part.

22. A plug-in connection comprising a plug part comprising:
a plug housing, in which a plug insert having at least one plug pin for receiving a conductor, is arranged, wherein
the plug part can be inserted into a correspondingly designed socket part in an insertion direction, and comprises
locking means for releasably locking the plug part in the socket part, and further has
unlocking means, by means of which the locking of the locking means to the socket part can be released, wherein
the plug part comprises a protective apparatus for protecting an end face of the plug pin, which protective apparatus can be moved from a closed position with said end face covered to an open position with said end face exposed,
the protective apparatus can be moved from the closed position to the open position by inserting the plug part into the socket part by interacting with the socket part, and
the unlocking means is displaceably mounted on the plug housing substantially along the insertion direction, wherein the unlocking means can interact with the locking means in such a way that, in the case of longitudinal displacement of the unlocking means with respect to the plug housing substantially in the direction against the insertion direction, locking which is established by the locking means can be released; and
a socket part as claimed in claim 18.

23. The plug-in connection as claimed in claim 22, wherein the unlocking means is arranged at least partially between the plug housing and a side wall of the socket part when the plug part is fully inserted into the receiving space, wherein the locking means engages in a latching manner into the latching means of the socket part.

* * * * *